H. L. DOHERTY.
METHOD OF SEPARATING GASES.
APPLICATION FILED MAR. 3, 1910.
1,150,837.
Patented Aug. 17, 1915.
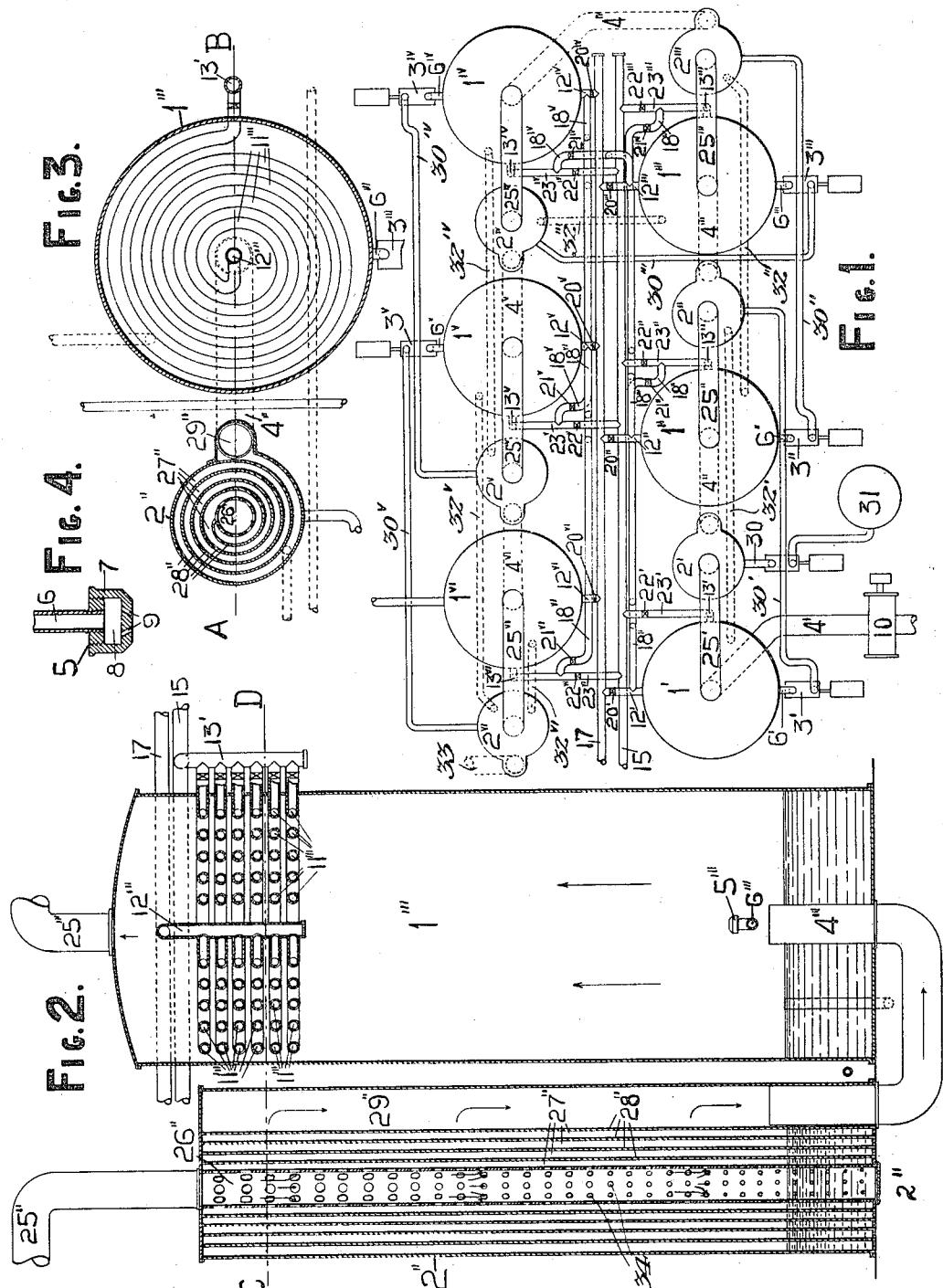
Witnesses:
Thos. J. Carter
Henry L. Doherty, Inventor
By his Attorney Frank S. Young

UNITED STATES PATENT OFFICE.

HENRY L. DOHERTY, OF NEW YORK, N. Y.

METHOD OF SEPARATING GASES.

1,150,837. Specification of Letters Patent. Patented Aug. 17, 1915.

Application filed March 3, 1910. Serial No. 547,142.

*To all whom it may concern:*

Be it known that I, HENRY L. DOHERTY, a citizen of the United States, and a resident of New York city, in the county of New York and State of New York, have invented certain new and useful Improvements in Methods of Separating Gases, of which the following is a specification.

This invention relates to a method for separating gases with special reference to the separating of the contaminating constituents of illuminating and heating gases from the useful constituents.

The object of my invention is to furnish a method of purifying gases which will permit of the use of simple and inexpensive apparatus and of accomplishing the purification with the use of a less volume of scrubbing liquid than is required by present methods.

A further object of my invention is the carrying out of the purification of gases with liquid instead of solid purifying agents.

As applied to the purification of ordinary coal gas a specific object of my invention is the carrying out of the purification of the gas in such a way that a strong ammoniacal liquor may be obtained directly from the separating chambers.

Briefly, my invention consists in passing the gas from which the impurities are to be separated through a series of chambers, in which the gas is contacted with an absorbent liquid which flows from chamber to chamber in a direction opposite to the direction of travel of the gas, the contact between the absorbent liquid and the gas being secured by introducing the former into the latter as a fog. The cooling of the gas is effected by passing the fog-laden gas over spiral coils of pipe through which cooling water is circulated.

In the drawings, Figure 1 is a diagrammatic plan of my apparatus. Fig. 2 is a vertical cross-section through one of the separating chambers and a liquid separator coöperating with the preceding gas chamber on the line A B of Fig. 3. Fig. 3 is a horizontal cross-section through the same on the line C D of Fig. 2. Fig. 4 is a section through one of the spraying caps.

$1'$, $1''$, $1'''$, etc., are the gas separating vessels.

$2'$, $2''$, $2'''$, etc., are the vessels in which the gas-absorbing liquid is again separated from the gas before the latter passes to the next chamber.

$3'$, $3''$, $3'''$, etc., are the pumps for forcing the gas-absorbing liquid from one separating chamber to the next.

The gas, which is to be treated for the separation of its contaminating constituents enters the first separating vessel $1'$ through the pipe $4'$ and passes successively through all of the sets $1'$—$2'$, $1''$—$2''$, etc. These sets of separating vessels are all alike in construction and a description of the passage of the gaseous current through any one will answer for all. In the drawings, I have shown in detail the vessels $2''$—$1'''$. In this, the mist-laden gas from the vessel $1''$ enters the vessel $2''$ from $25''$. This pipe $25''$ is connected with the pipe $26''$ on the axis of the vessel $2''$ which latter pipe reaches to the bottom of $2''$. $26''$ is provided with a large number of apertures, $34''$. The mist-laden gas issues through these apertures along the length of $26''$ and enters the spiral passage $27''$ formed by the spiral sheet $28''$. In passing through $27''$ a high angular velocity is communicated to the gas current, the liquor particles therein being thrown to the periphery of the angularly-moving gaseous body and thus into contact with the outer wall of the passage $27''$. The force of adhesion between the wall surface and the liquor particles is sufficient to retain the fine globules of liquor which coalesce to form large drops which, in turn, form a multitude of streamlets or, where the proportion of water is large, a continuous sheet covering the spiral wall. This method of separating suspended liquid particles from gas I do not claim specifically herein as it forms the subject matter of my co-pending application Ser. No. 535,843, filed Dec. 31st, 1909. The liquor thrown off from the gas collects in the bottom of vessel $2''$, from which it is drawn off by the pump $3'$ and sprayed into the first vessel $1'$ of the series. The gas, practically freed from the suspended liquor, discharges from the passage $27''$ into the collecting chamber $29''$. From $29''$ the gas passes through the U-passage $4'''$ into the lower part of chamber $1'''$. Here it is again loaded with a spray of liquor which is pumped from the vessel $2^{IV}$, by the pump $3'''$, through the pipe $6'''$ to the spray cap $5'''$, by which it is divided into a very fine spray. The form of spraying device used may be of any design which will effect the thorough atomization of the liquor into a very fine mist or spray. Preferably it is of the type of apparatus which I have revealed and claimed in my Letters Patent No. 901,597, dated Oct. 20th, 1908. It consists of a solid cap, 7, closing a small pressure chamber, 8, into which the pipe 6 discharges. This cap 7 is perforated by a plurality of couples of fine apertures, 9. The apertures forming each couple are bored so as to make equal angles in the same plane with the face of the spraying cap 7 at an acute angle with each other. The fine streams emerging from the coöperating apertures are thus caused to mutually impinge and interfere with each other to cause a mutual breaking up of the streams to exceedingly fine mist-like globules of liquid, which are taken up in suspension by the current of gas entering through the gas inlet pipes 4 of the respective chambers to form a dense fog. In this way, I secure a more intimate contact between the gas stream and the liquid used than is practicable by any other method, since the impalpably fine globules of liquid expose to the gas in relation to the weight of the liquid an enormous surface of contact. It is to be noted that the fresh water, or whatever other liquid is used, is pumped into the chamber $1^{VI}$, the one from which the purified gas discharges, taking up the last of the impurities from the gas, and is separated in the vessel $2^{VI}$. From this, it is pumped by pump $3^{V}$ into chamber $1^{V}$, takes up more impurities from the gas passing through this chamber, is separated from the gas again in $2^{V}$, and so on, until it is drawn off from $2'$ through pipe 30 and run or pumped to the storage well 31.

In each of the chambers $1'$, $1''$, etc., is a set of cooling coils, similar in all respects to the coils $11'''$ of chamber $1'''$. These are simply spiral coils of pipe, the inner extremity of the pipe of each coil being connected to a water supply pipe $12'''$ located at approximately the axis of the chamber. The peripheral extremities of the pipes forming the coils are connected into the pipe $13'''$. From $13'''$ the water may pass through the connection $23''$ direct to the waste main 15 or through appropriate connections from chamber to chamber. Instead of supplying the water directly to each of the several coils in the arrangement shown, the cooling water from supply pipe 17 may, if preferred, be introduced first into the coils of the last gas chamber $1^{VI}$, through the connection $12^{VI}$, passes through the coils of $1^{VI}$, thence through $13^{VI}$ and $18^{VI}$ to the connection $12^{V}$ to the coils of $1^{V}$. From the coils of $1^{V}$ through the connections $13^{V}$, $18^{V}$, $12^{IV}$, coils of $1^{IV}$, $13^{IV}$, $18^{IV}$, $12'''$, coils of $1'''$, $18'''$, $12''$, coils of $1''$, $18''$, $12'$ coils of $1'$, $13'$, and $23'$ to waste main 15. Valves $22'$, $22''$, $22'''$, $22^{IV}$, $22^{V}$, $22^{VI}$, $21'$, $21''$, $21'''$, $21^{IV}$, $21^{V}$, $21^{VI}$, $20'$, $20''$, $20'''$, $20^{IV}$, $20^{V}$, $20^{VI}$ control the flow of water through the various lines. As is obvious from the drawings, by the proper adjustment of the valves, a direct flow of fresh water may be established from the water main 17 through the respective coils of the separating chambers to the water main 15, as mentioned above. The fog-laden gas passing through these cooling coils has its temperature reduced so that the gas-absorbing capacity of the liquid is increased. There is, therefore, a still further purification of the gas while passing through the liquor separators. As there is more or less precipitation of the liquor sprayed into the vessels $1'$, $1''$, etc., there is a gradual accumulation of liquor in the bottoms of the vessels. To carry this off overflows $32'$, $32''$, $32'''$, $32^{IV}$, $32^{V}$ and $32^{VI}$ are provided. These are so arranged that each of the vessels $1'$, $1''$, etc., overflows respectively into the liquor separator $2''$, $2'''$, etc., from which the pump supplying that particular vessel draws its supply, through the connecting pipes $30'$, $30''$, etc., respectively. Now, in withdrawing impurities from gases by absorbing the same in suitable liquids the time of contact necessary between the gas and the liquid and the size of the vessel necessary is simply a question of the degree of intimacy of contact that is secured between the liquid and the gas. For the absorption of the constituents of the gas which are soluble in the liquid used, it is essential that every molecule of the soluble gases should be brought into substantial contact with or exceedingly close juxtaposition with a particle of the liquid. In ordinary methods of securing the contact of the gas and liquid the former is passed through a chamber in which in passing it brushes against a multitude of thin films of liquid. The intervals separating the liquid films are usually very considerable. The local circulation of the particles of the gas due to the formation of eddies is relied upon to bring each particle of the gas into contact with the liquid films, to permit of the selective absorption by the liquid of those particles of the gas which are soluble in it. Even when the contact between the gas and liquid is secured by causing the former to bubble through the latter, great intimacy of contact is not secured since the gas passes through the liquid in large bubbles, only the particles on the surface of which are in actual absorptive contact with the liquid. Besides, in this latter method of securing contact between gas and liquid, the hydrostatic head of the latter must be overcome by the gas, thus requiring the expenditure of a very considerable amount of power in the moving of the gas. By my method, however, where the gas flows freely through the separating chambers the only resistance opposed to the flow of the gas is simply that due to friction between the gas current and the walls of the gas passages and cooling coils. The amount of power required is therefore negligible and the gas may be moved with an ordinary blower. It is obvious that with the liquid suspended in the gas as a dense fog the interval separating any particle of the gas from a particle of liquid is indefinitely small. The result is that in any given chamber, the minute globules of liquid are almost immediately saturated with the soluble constituents of the gas under the conditions of temperature and vapor tension of the several constituents prevailing in that chamber. As is well known, the solubility of a gas in a liquid depends in large measure upon the tension of the gas in the atmosphere in contact with the liquid. For this reason, if a sufficient proportion of liquid were supplied to the gas in the one operation to remove all of the soluble gases it would be necessary that a very high ratio should be established between liquid and gas with a consequent formation of a very dilute liquor. For this reason it is necessary that the gas be subjected to a number of contacts with the liquid, the direction of flow of liquid and gas being opposite.

In describing my invention I will describe its application to the treatment of crude illuminating gas to separate therefrom the ammonia, carbon dioxid, hydrogen-sulfid, and other impurities. For this purpose the liquid used is generally water. The fresh water is introduced through the spraying device of separating chamber $1^{VI}$ in contact with the gas which has passed through the other chambers and therefore contains the least proportion of impurities, and passes from chamber to chamber in the reverse direction to the flow of gas. The crude gas enters the separating chamber $1'$ through the pipe $4'$ which is connected with the discharge pipe of blower 10. As it emerges from $4'$, the gas is loaded with a dense mist of the absorbing liquid which has already absorbed a relatively large proportion of the soluble gases by being contacted with gas containing an increasing proportion of impurities and which is technically known as ammoniacal liquor. The fog-laden gas passes upward through chamber $1'$, the particles of the liquor absorbing soluble impurities of the gas to the saturation point at the temperature and pressure prevailing in $1'$. Should the gas as entered through $4'$ not be fully saturated with water vapor there will of course be an evaporation of the water of the ammoniacal liquor until the gas is saturated. This evaporation would, of course, act to assist in the cooling of the gas. From $1'$ the gas passes through $25'$ to the liquor separator $2'$, thence through the U passage $4''$ into the chamber $1''$. From $1''$ the gas passes through $25''$ to $2''$, through $4'''$ to $1'''$, $25'''$ to $2'''$, $4^{IV}$ to $1^{IV}$, $25^{IV}$ to $2^{IV}$, $4^{V}$ to $1^{V}$, $25^{V}$ to $2^{V}$, $4^{VI}$ to $1^{VI}$, $25^{VI}$ to $2^{VI}$ and from $2^{VI}$ through the conduit 33 to a storage tank or mains.

When the ordinary illuminating gas is being treated, the ammonia separated will carry with it in combination sufficient of the other impurities such as carbon dioxid and hydrogen sulfid to saturate the ammonia. Besides, the liquor will saturate itself with dissolved $CO_2$ and $H_2S$. By using an ammoniacal liquor containing a quantity of free ammonia greater than the amount equivalent to the impurities of the gas, substantially all of the gaseous impurities may be separated from the gas in the liquor.

An important feature of my invention is the manner in which I cool the gases down to a temperature at which the vapor tension of the ammonia is low enough to permit of its separation with substantial completeness from the gas. As is well known, the rate of conduction of heat from water to water through a separating metal wall is comparatively rapid while the rate of conduction from water to gas is relatively quite slow. Now by lading the gas, as I do by my invention, with a dense fog of water (in the present case) I greatly increase the rate of heat transfer from the gas to water—to a degree, in fact, comparable with the rate of conduction from water to water. The heat of the gas is almost instantly transferred in part to the suspended liquid particles. As the gas passes through the coils, a layer of liquid is precipitated upon them which is being constantly swept off by the gaseous current to be replaced by fresh liquid. The effect is somewhat similar to that which is obtained in the cooling coils for ammonia commonly used in connection with refrigeration works, except that the fluid to be cooled is here on the outside of the tubes, and the flow of heat is in the reverse direction to that which obtains in the type of cooling coils referred to.

While I have selected the specific application of my invention to the separation from the distillation gases of coal of the impurities occurring therein, it is obvious that my invention is of general application wherever a gas soluble in a liquid is to be separated from a gas or gases insoluble in the liquid. For example, my invention is specially applicable to the separation of the very dilute nitric oxid gases formed by the several electrolytic methods for manufacturing nitric acid from atmospheric nitrogen, from the diluent gases. It is also an admirable method for the separation of carbon-dioxid from combustion gases by absorbing the same in alkali solution for the purpose of obtaining pure carbon-dioxid for liquefaction. There are many other cases occurring in the various industries in which my invention may be advantageously applied.

Having described my invention, what I claim is:—

1. The process of separating gases which comprises projecting upward into the gas mixture and in the direction of flow of said mixture a fog or mist of an absorbent liquid, whereby the liquid particles of said mist are caused to be borne in suspension by said gas mixture to absorb soluble constituents of the same, cooling said mist laden gas mixture, and separating said mist with its dissolved gases from said mixture by contacting the mist laden gas mixture with surfaces covered by a film of said liquid.

2. The process of separating gases which comprises cooling the gas mixture down to a temperature at which one or more of the constituents of the gas mixture are soluble in a liquid, vertically projecting said liquid upward in an atomized condition into the said gas mixture and in the direction of flow of said gas mixture, whereby particles of said atomized liquid of sufficient fineness to be floatant in said gas mixture are borne along by the same, while the larger particles of said liquid are caused to fall through the said upwardly moving gas mixture in the direction contrary to the direction of their projection into said gas mixture and their period of contact with said gas mixture prolonged, cooling the said gas mixture while laden with said atomized liquid, and removing said atomized liquid from said gas mixture by contacting the particles of said liquid with precipitating surfaces by leading said gas mixture through a spiral path at a comparatively high velocity.

3. The process of separating easily soluble gases from relatively insoluble gases which comprises, subjecting the gas mixture to a plurality of cooling operations, injecting into the said gas mixture before each cooling operation, while the said mixture has a vertically upward flow and in the direction of said flow, a mist of an absorbent liquid, prolonging contact between said gas mixture and said mist until saturation equilibrium has been established while subjecting said gas mixture to cooling, and separating from the gas mixture the mist injected in one operation before the injection of absorbent liquid in the next cooling operation.

4. The process of separating soluble gases from relatively insoluble gases which comprises injecting into the vertically upward flowing gas mixture and in the direction of flow of said mixture a mist of a solvent liquid, passing the mist-laden gas mixture in contact with cooling surfaces until the said mist is substantially saturated with the said soluble gases, separating the said mist from the said gases, again establishing a substantially upward flow of said gas mixture and injecting into the said mixture in the direction of its flow a second portion of misted solvent liquid containing a lower proportion of the soluble gases than the first portion of said liquid, subjecting the mist-laden gas mixture to further cooling, whereby further quantities of the soluble gases are dissolved by said second portion of solvent liquid, separating the said second portion of solvent liquid from said gas mixture, and repeating said operations with further portions of misted solvent containing successively a lower and lower proportion of dissolved gases, and at successively lower temperatures, until the desired proportion of the soluble gases of said gas mixture have been separated therefrom.

5. The process of separting from a gas mixture one or more constituents thereof which are capable of absorption in a liquid which comprises cooling the gas mixture to a temperature at which one or more of the said constituents are soluble in said liquid, introducing thereinto a portion of the absorbent liquid as a mist, the liquid particles forming said mist being of such size as to be floatant in said gas mixture, prolonging contact between said gas mixture and said mist until saturation equilibrium has been established between said gas mixture and said liquid, subjecting the gas mixture while laden with the mist of absorbent liquid to cooling, separating out the said first portion of absorbent liquid, introducing into the unabsorbed gases a second portion of absorbent liquid as a mist, subjecting the said gases while laden with the mist of the said second portion of absorbent liquid to cooling, separating the said mist of the said second portion of absorbent liquid from the unabsorbed gases after said second portion of liquid has become saturated with constituents to be removed, and repeating the said operations until the desired proportion of the constituent which it is desired to separate from the gas mixture has been absorbed by the said absorbent liquid.

6. The process of separating mixed gases which comprises passing the gas mixture successively through a series of chambers, introducing into the gas mixture in each chamber a mist of an absorbent liquid, the particles of liquid forming said mist being of sufficient fineness to be floatant in said gas mixture, prolonging contact between said gas mixture and said mist until saturation equilibrium has been substantially established between said gas mixture and said liquid, cooling the mist-laden gas mixture after the same has passed through one chamber and separating the mist from the unabsorbed gases of the mixture before introducing the same into the next chamber, the said absorbent liquid being first introduced into the portion of the gas mixture passing through the last chamber of the series and then into the portion of the gas mixture passing through the other chambers in the reverse order to that of the progression of the gas mixture.

7. The process of separating gases soluble in water from gases which are relatively insoluble in water, which comprises, subjecting the gas mixture to a number of successive cooling operations to effect a graduated cooling of said gas mixture, injecting into the said gas mixture before each cooling operation a plurality of fine streams of water at a high velocity, said streams being so directed relatively to each other as to effect mutual impingement and disintegration to produce a mist whose particles are of such size as to be floatant in the current of said gases, and removing from the gas mixture the mist injected in one operation before the injection of water in the next operation, the said water being successively injected into the said gas mixture in said cooling operation in the reverse direction of progression to that of the said gas mixture.

8. The process of separating gases soluble in water from gases which are relatively insoluble in water, which comprises, subjecting the gas mixture to a number of successive cooling operations to effect a graduated cooling of said gas mixture, injecting into the said gas mixture in the general direction of the flow of said mixture, before each cooling operation, a plurality of fine streams of water at a high velocity, said streams being so directed relatively to each other as to effect mutual impingement and disintegration to produce a mist whose particles are of such size as to be floatant in the current of said gases, and removing from the gas mixture the mist injected in one operation before the injection of water in the next operation, the said water being successively injected into the said gas mixture in said cooling operation in the reverse direction of progression to that of the said gas mixture, whereby soluble impurities are dissolved in said water and thereby separated from said gas mixture.

9. The process of separating ammonia and other gases from crude coal gas, which comprises, establishing a plurality of contacts between said crude gas and an oppositely progressing body of absorbing liquid, the said liquid during said contacts being reduced to the fineness of a mist, said mist being formed by discharging under pressure into said crude gas a plurality of mutually impinging streams of said liquid, whereby said streams are disintegrated to form said mist, and subjecting the mist-laden gas during each of said contacts to graduate cooling.

10. The process of separating ammonia and other gases from crude coal gas, which comprises, establishing a plurality of contacts between said crude gas and an oppositely progressing body of absorbent liquid, the said liquid during said contacts being reduced to the fineness of a mist, said mist being formed by discharging under pressure into said crude gas a plurality of mutually impinging streams of said liquid, whereby said streams are disintegrated to form said mist, subjecting the mist-laden gas during each of said contacts to graduated cooling, separating the mist introduced during one of said contacts from said gas mixture in the liquid condition, moving the separated liquid in the opposite direction to that of progression of said gas mixture, again discharging said liquid into said gas mixture in a plurality of impinging streams, the number of said contacts being regulated to that which will remove from said crude gas the desired proportion of said ammonia and other gases.

Signed at New York city in the county of New York and State of New York this 2nd day of March A. D. 1910.

HENRY L. DOHERTY.

Witnesses:
Thos. I. Carter,
W. J. Quentin.